United States Patent

Palmer et al.

[15] 3,653,682
[45] Apr. 4, 1972

[54] ENERGY ABSORBING DEVICE

[72] Inventors: Roy M. Palmer; Francis M. Kobayashi, both of South Bend, Ind.

[73] Assignee: The Bendix Corporation

[22] Filed: Apr. 17, 1970

[21] Appl. No.: 29,571

[52] U.S. Cl. ............................................280/124 F, 267/65
[51] Int. Cl. ..............................................................B60g 11/26
[58] Field of Search ......................267/15 A, 15, 21, 64, 65; 280/124 F

[56] References Cited

UNITED STATES PATENTS 2,621,036  12/1952  Rother...............................267/65 X

FOREIGN PATENTS OR APPLICATIONS 219,028  2/1958  Australia..............................267/15 A

*Primary Examiner*—Philip Goodman
*Attorney*—William N. Antonis, Plante, Arens, Hartz, Smith & Thompson and Gordon H. Chinez

[57] ABSTRACT

An energy absorbing device comprising: a primary energy absorber, lever means operatively connected to the primary energy absorber, a wheel rotatably carried by the lever means, and a secondary energy absorber operatively interposed between the primary energy absorber and the lever means. The secondary energy absorber includes a variable volume fluid chamber and a valve for communicating the chamber with a fluid pressure source. The secondary energy absorber is responsive to relatively large vertical deflections of said wheel to minimize the effect thereof on said primary energy absorber means.

10 Claims, 5 Drawing Figures

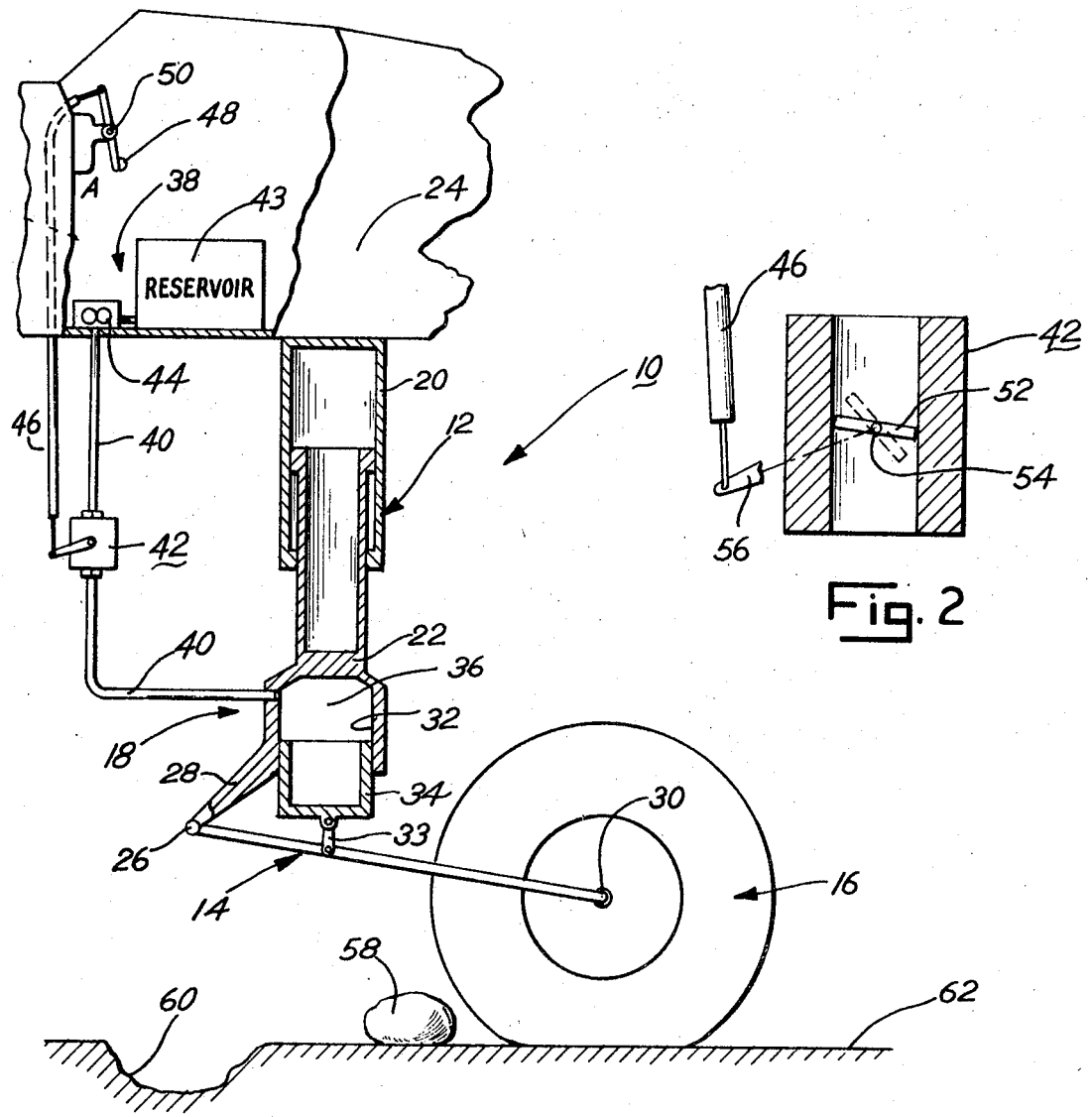

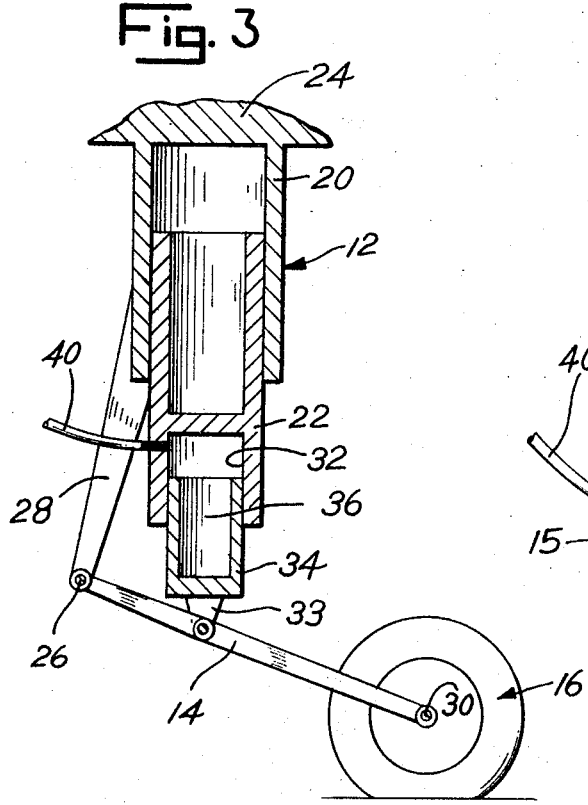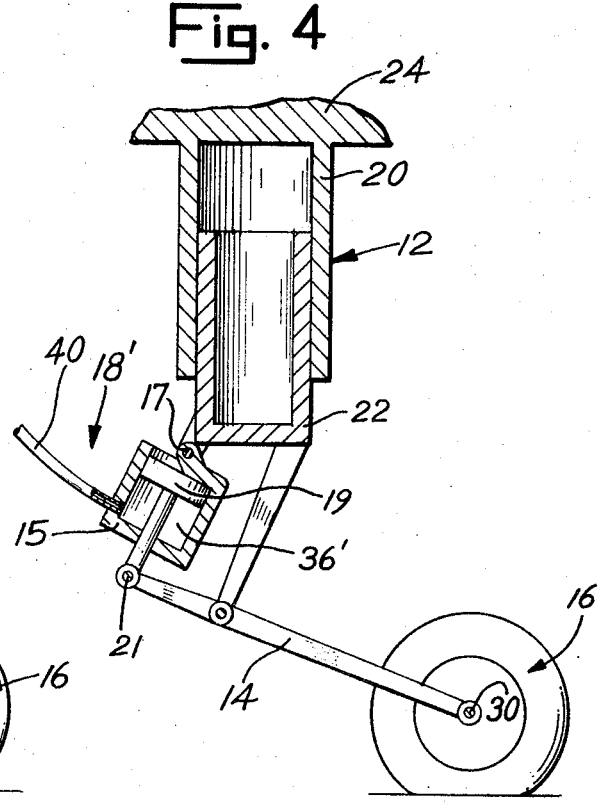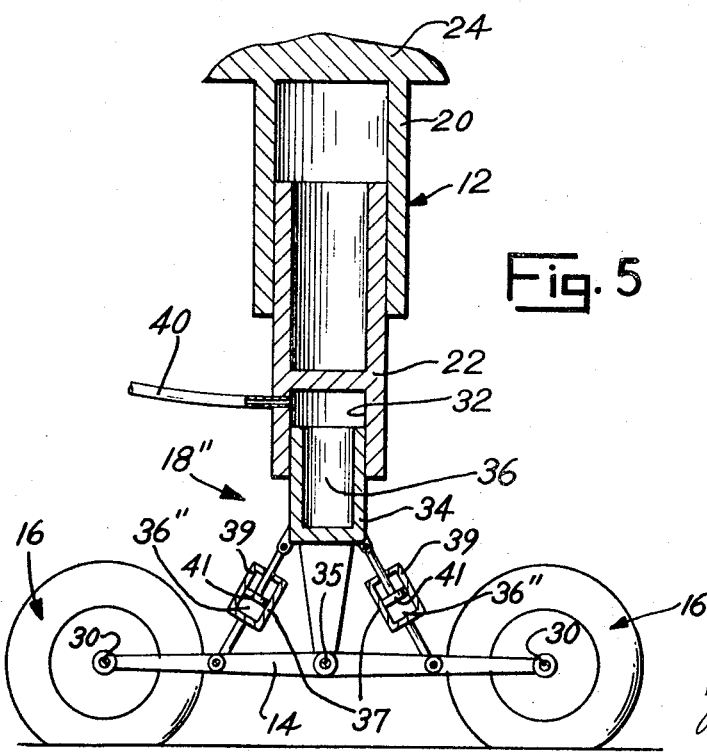

ENERGY ABSORBING DEVICE

BACKGROUND OF THE INVENTION

This invention relates to an energy absorbing device for use with an aircraft landing gear, and more particularly to a gear for landing on rough terrain. Theoretical and experimental studies of the problem of landing and taxiing over rough terrain have shown that the conventional shock absorbing mechanisms known in the art are incapable of satisfactorily attenuating loads resulting from bump impact vertical deflections. This is primarily due to the fact that the shock absorbing mechanism is not compatible with the frequencies and mode shapes of the bump impact input. As a result, the shock strut usually acts essentially as a rigid link, stroking only a small amount, whereby most of the loads are absorbed by the tire and/or are transmitted directly to the airframe through the landing gear hard points.

SUMMARY OF THE INVENTION

It is an object of this invention to provide an improved energy absorbing device for use in association with landing on rough terrain.

It is an object of this invention to provide an improved energy absorbing device that is not impaired during its use on normal terrain.

It is an object of this invention to provide an improved energy absorbing device that is adaptable to any conventional type of landing gear system.

It is an object of this invention to provide an improved energy absorbing device which includes a primary and secondary energy absorber.

It is an object of this invention to provide an improved energy absorbing device wherein a secondary energy absorbing means is specifically designed to minimize the effect of relatively large vertical deflections of an aircraft wheel on the airframe.

Other objects and features of the invention will be apparent from the following description of the energy absorbing device taken in connection with the accompanying drawings.

BRIEF DESCRIPTION OF THE DRAWINGS

FIG. 1 is a diagrammatic view, partially in section, showing a landing gear arrangement which incorporates the invention;

FIG. 2 is an enlarged sectional view of the valve shown in FIG. 1;

FIG. 3 is a diagrammatic view depicting a modified form of the invention shown in FIG. 1;

FIG. 4 is a diagrammatic view depicting another modified form of the invention shown in FIG. 1; and FIG. 5 is a diagrammatic view depicting still another modified form of the invention shown in FIG. 1.

DESCRIPTION OF THE PREFERRED EMBODIMENT

Referring now to FIG. 1, therein is shown the energy absorbing device of this invention; the device being generally identified by the numeral 10.

The energy absorbing device 10 is comprised of a primary energy absorber 12, a lever 14, a wheel 16 and a secondary energy absorber 18. The primary energy absorber 12 is a conventional shock absorber or strut which includes an upper cylindrical telescopic member 20 and a lower piston-like telescopic member 22. The upper telescopic member 20 is rigidly secured to the frame of the aircraft 24 (FIG. 1 showing a fragmented portion only of the frame 24). The lever 14 is pivotally connected at 26 to an extended portion 28 of the lower telescopic member 22 of the primary energy absorber 12. The wheel 16 is rotatably carried at 30 by the lever 14. The secondary energy absorber 18 includes a cylindrical bore 32 formed by the lower member 22 and a piston 34. The piston 34 has a linkage portion 33 which is pivotally connected thereto and to the lever 14. The bore 32 slidingly and sealingly receives piston 34 to form a variable volume fluid chamber 36, which is in communication with a suitable fluid pressure source 38 through a conduit 40 and a valve 42. As will be understood by those skilled in the art, the fluid pressure source 38 may comprise a fluid reservoir 43 which is located with respect to said secondary energy absorber 18 so as to apply a predetermined head of pressure to said fluid; or may further include a pump 44 for pressurizing the fluid. It is further noted that the conduit 40 is preferably made of flexible material to facilitate the telescoping action of the energy absorbers 12 and 18.

Referring to FIGS. 1 and 2, it will be seen that the valve 42 is controlled from a remote location, such as, for example, via a cable 46 and a manually operated lever 48 which is pivotally mounted in the cockpit of the aircraft at 50. The valve mechanism 42 includes a butterfly valve 52, which is connected to the cable 46 through a pin 54 and lever 56 arrangement and is movable to an open position by the manually operated lever 48, as shown by the dotted outline in FIG. 2. It will be noted that the valve mechanism 42, shown in FIG. 2, is intended to regulate the fluid pressure in chamber 36 and thereby control the movement or stroking of the piston 34 during a bump impact upon landing. Therefore, the specific valve structure shown may be modified to accept any suitable valve known to the art. Further, the valve mechanism 42 may be used to regulate the rate of flow of fluid between chamber 36 and the source of fluid 38 and thereby control the stroking of the piston 34 in response to a bump impact landing. Of course, if the valve 42 is used to regulate flow, rather than pressure, the pump 44 would be equipped with a suitable bypass, operable during landings, to facilitate the fluid flow between the chamber 36 and the source of fluid 38. The specific setting of the valve 42 to determine the rate of fluid flow therethrough is determined by the type of terrain on which the aircraft will be landing; i.e., for landings on rough terrain, more stroking of the secondary energy absorber 18 is desired, and a larger valve opening is needed. During normal landings it is intended that chamber 36 be pressurized to a level that substantially precludes stroking of the secondary energy absorber 18.

MODE OF OPERATION OF THE PREFERRED EMBODIMENT

With the foregoing landing gear arrangement, it will be evident to those skilled in the art that the pivotal connection 26 between the primary energy absorber 12 and lever 14 permits movement of the lever 14 and wheel 16 in a vertical direction upon impact with a rock or bump 58, or a hole or rut 60 to minimize if not eliminate the effect of the vertical deflections on the airframe 24.

Assume then that a landing is being made on rough terrain by an aircraft equipped with the energy absorbing device 10. Upon touchdown of the wheel 16 on the generally level portion of the terrain 62, the energy absorbing device 10 would typically be loaded as shown in FIG. 1. As the wheel 16 engages either the rock 58 or hole 60, the piston 34 will stroke within the bore 32 to absorb the bump. Obviously, the distance of the stroke will be determined by the prevailing fluid pressure level in the chamber 36 which is predetermined by the valve position setting made prior to the landing.

DESCRIPTION OF THE MODIFIED EMBODIMENTS

In FIGS. 3, 4 and 5, which show modified forms of the invention, parts which are identical or similar to those used in FIG. 1 will be given the same identifying number.

More specifically, in FIG. 3 the extended portion 28 is connected to the upper telescopic member 20, rather than the lower telescopic member 22, as shown in FIG. 1.

In FIG. 4 the secondary energy absorber is identified as 18' and is comprised of a housing 15 pivotally attached to the lower telescopic member 22 as at 17 and a piston member 19 slidably installed in the housing 15 and pivotally attached to the lever means 14 as at 21. The housing 15 and piston member 19 form the variable volume fluid chamber 36' which, of course, allows the secondary energy absorber 18' to function in the same manner as the secondary energy absorber 18, shown in FIG. 1.

Regarding FIG. 5, the secondary energy absorber means is identified as 18'' and is comprised of the variable volume fluid chamber 36 and the two energy absorbers 37. The piston 34 is pivotally connected at 35 to the lever 14 which in this case carries a wheel 16 on each end thereof. The energy absorbers 37 are pivotally attached on one end to the lever means 14 and on their other end to the piston 34. Each of the energy absorbers 37 is comprised of a housing portion 39 and a piston member 41 which together form chamber 36''. As will be seen upon examination of the drawing, vertical deflections of either or both wheels 16 will cause some of the energy from the impact to be absorbed in each energy absorber 37. The remaining energy will be transmitted directly into the variable volume fluid chamber 36, which will likewise function in the same manner as the secondary energy absorber 18, shown in FIG. 1.

While specific details have been herein shown and described, the invention is not confined thereto since other changes and substitutions can be made within the spirit and scope of the invention.

We claim:

1. An energy absorbing device comprising:
primary energy absorber means;
lever means operatively connected to said primary energy absorber means;
wheel means rotatably carried by said lever means; and
secondary energy absorber means operatively interposed between said primary energy absorber means and said lever means;
said secondary energy absorber means including a variable volume fluid chamber and valve means for communicating said chamber with a fluid pressure source;
said secondary energy absorber means being responsive to relatively large vertical deflections of said wheel means to minimize the effect thereof on said primary energy absorber means.

2. An energy absorbing device, as recited in claim 1, wherein said fluid pressure source is located remotely with respect to said secondary energy absorber means.

3. An energy absorbing device, as recited in claim 1, wherein said valve means is located remotely with respect to said secondary energy absorber means.

4. An energy absorbing device, as recited in claim 1, which includes means for controlling said valve means from a remote location with respect to said secondary energy absorber means.

5. An energy absorbing device, as recited in claim 1, wherein said variable volume fluid chamber comprises an outer cylinder operatively connected to said primary energy absorber means, and an inner cylinder slidingly and sealingly disposed in said outer cylinder and operatively connected to said lever means.

6. An energy absorbing device as recited in claim 1, wherein said valve means has a predetermined setting which is a function of the magnitude of the anticipated vertical deflections.

7. An energy absorber device, as recited in claim 1, wherein vertical deflections of said wheel cause a reduction in volume of said variable volume fluid chamber and consequent displacement of fluid from said chamber to said fluid pressure source through said valve means.

8. An energy absorbing device comprising:
primary energy absorber means;
secondary energy absorber means;
lever means pivotally connected to said secondary energy absorber means; and
wheel means rotatably carried by said lever means;
said secondary energy absorber means including a variable volume fluid chamber and valve means for communicating said chamber with a fluid pressure source;
said secondary energy absorber means being responsive to relatively large vertical deflections of said wheel means to minimize the effect thereof on said primary energy absorber means.

9. An energy absorbing device, as recited in claim 5, wherein said fluid pressure source and valve means are located remotely with respect to said secondary energy absorber means.

10. An energy absorbing device, as recited in claim 9, which includes means for controlling said valve means from a remote location with respect to said secondary energy absorber means.

* * * * *